Patented May 18, 1937

2,080,681

UNITED STATES PATENT OFFICE 2,080,681

MOTOR FUEL

Jesse Russell Wilson, Chicago, Ill., and Vanderveer Voorhees, Hammond, Ind., assignors to Standard Oil Company, Chicago, Ill., a corporation of Indiana No Drawing. Application July 28, 1933, Serial No. 682,667

12 Claims. (Cl. 44—9)

This invention relates to an improved motor fuel and it pertains more particularly to a motor fuel containing a gum flux.

Motor benzol, and particularly cracked gasolines, contain large quantities of unsaturated hydrocarbons such as the olefins and diolefins. When such motor fuels are stored for relatively short periods of time, the unsaturated hydrocarbons oxidize and/or polymerize and form gum. Some of the gum that forms during storage precipitates whereas a large part of the gum remains dissolved and/or suspended in the gasoline. When a cracked gasoline, containing dissolved or suspended gum, is used in an internal combustion engine, the gum deposits on the valves, in the cylinders and in the fuel induction system when the fuel is vaporized. The fraction of gum that deposits in the cylinders is soon carbonized on the pistons and valves, thereby greatly impairing the efficiency of the engine and causing the valves to stick.

The object of our invention is to provide a motor fuel which contains a solvent or gum flux that has a selective solvent action on gasoline gum and will prevent or greatly retard the precipitation of gum in the fuel system of the engine.

A particular object of our invention is to provide a motor fuel with a gum flux which will retard the precipitation of gum and the formation of hard carbon deposits in the cylinders of internal combustion engines.

The gums formed by the oxidation and/or polymerization of the unsaturated constituents in motor fuels have high molecular weights and are substantially insoluble in petroleum hydrocarbons after they have once deposited and been subjected to heat. In fact, they form a varnish-like coating which may become insoluble in any known organic solvent if not removed before polymerization has proceeded too far. We have found that normally liquid aromatic hydrocarbons having a boiling point above 450° F. and preferably above 500° F. may be dissolved in gummy motor fuels in quantities ranging from 0.2% to 2% and thereby prevent or greatly retard the precipitation of gum on the valves and in the cylinders of internal combustion engines. The presence of an aromatic gum flux in the motor fuel prevents the gums from being carbonized and reduced to a hard coke by removing them before they have become too highly polymerized. Consequently the valves remain free acting and the operation of the engine is not impaired. In order to obtain really effective results from the use of a gum flux of this type, it is necessary to have it continually present during the operation of the engine, as otherwise the deposited gum rapidly hardens and cannot be removed. One of the essential and unique characteristics of our flux is its low volatility combined with high solvent power which enables it to act as a liquid flux at relatively high engine temperatures whereas gum solvents commonly used heretofore have been of the volatile type having good solvent power for the gum but incapable of exerting its action during the operation of the engine at the critical time when the gum is being deposited and polymerized.

The gum solvents used in our invention are soluble in cracked gasoline. The gum flux should normally be liquid so that it does not crystallize at low seasonal temperatures and we make use of mixtures of different fluxes to obtain still lower freezing points. Most of the gum fluxes are normally liquid, high boiling, carbo-cyclic aromatic hydrocarbons. The boiling point of the flux should be well above the end boiling point of the gasoline so that the flux will be sprayed into the manifold and cylinders in the form of a mist. Generally, compounds boiling between 500 and 600° F. are preferable, but compounds boiling as low as 450° F. may be used with a reasonable degree of success. Examples of the compounds which may be used for our invention are: Ortho- meta- and para-phenyl toluene, dihydro ethyl anthracene, alpha methyl naphthalene, 1-4 dimethyl naphthalene, alpha and beta ethyl naphthalene, alkyl naphthalenes, beta-n-propyl naphthalene, alpha-n-propyl naphthalene, alpha-n-butyl naphthalene, beta-n-butyl naphthalene, alpha and beta phenyl naphthalenes, ac-tetra beta naphthol, ethyl benzyl benzene and alpha diphenyl ethane. Mixtures of the above compounds may be used.

By dissolving about 0.2 to 2% of one or a mixture of the compounds set forth in the above groups in gasoline, the formation of hard carbon deposits in the engine can be greatly reduced by an amount of about 70–90%. However, the amount of carbon formed will depend somewhat upon the type of motor fuel used. In addition to the elimination of carbon in internal combustion engines, the gum fluxes tend to stabilize the color of cracked gasoline and prevent sedimentation during storage.

If desired, antioxidants may be used in combination with the gum fluxes and thereby aid in reducing the available gum in the gasoline. Suitable antioxidants are the polyhydroxy compounds such as catechol, anthraquinone and pyrogallol; aminophenols such as ortho-meta- and para aminophenol, para-phenyl aminophenol, methyl aminophenols. phenyl aminophenols, para-benzyl aminophenol and the like.

We claim:

1. A motor fuel comprising cracked gasoline containing non-volatile gum which normally tends to deposit on the valves and in the cylinders of the motor and containing, as a gum flux, from 0.2 to 2% of a normally liquid carbocyclic hydrocarbon having a boiling point above 450° F.

2. A motor fuel comprising unsaturated hydrocarbons and containing non-volatile gum which deposits on the valves and in the cylinders of the motor and containing, as a gum flux, from 0.2 to 2% of a normally liquid carbo-cyclic hydrocarbon having a boiling point between 450 and 600° F.

3. A motor fuel comprising gasoline with a non-volatile gum dissolved therein which normally tends to deposit on the valves and in the cylinders of the motor and containing, as a gum flux, from 0.2 to 2% of a normally liquid carbo-cyclic hydrocarbon having a boiling point between 500 and 600° F.

4. A motor fuel comprising unsaturated gasoline containing non-volatile gum which normally deposits on the valves and in the cylinders of the motor and containing, as a gum flux, from 0.2 to 2% of a normally liquid naphthalene hydrocarbon having a boiling point above 450° F.

5. A motor fuel comprising unsaturated gasoline containing non-volatile gum which deposists on the valves and in the cylinders of the motor and containing, as a gum flux, from 0.2 to 2% of a normally liquid naphthalene hydrocarbon having a boiling point between 500 and 600° F.

6. A motor fuel comprising cracked gasoline which contains non-volatile gum that deposits on the valves and in the cylinders of the motor and containing, as a gum flux, from 0.2 to 2% of a normally liquid alkylated naphthalene hydrocarbon having a boiling point above 450° F.

7. A motor fuel comprising cracked gasoline containing non-volatile gum which deposits in the cylinders of the motor and containing, as a gum flux, from 0.2 to 2% of a normally liquid alkylated naphthalene compound having a boiling point above 500° F.

8. A motor fuel comprising gasoline containing a non-volatile gum dissolved therein which normally tends to deposit in the cylinders of the motor and containing, as a gum flux, from 0.2 to 2% of a normally liquid alkylated naphthalene hydrocarbon having a boiling point above about 500° F.

9. A motor fuel comprising gasoline containing a non-volatile gum dissolved therein which normally tends to deposit in the cylinders of the motor and containing, as a gum flux, from about 0.2 to 2% of a normally liquid naphthalene hydrocarbon having at least one alkyl group containing from two to four carbon atoms attached to the naphthalene ring and said compound having a boiling point above 450° F.

10. A motor fuel comprising gasoline containing a non-volatile gum dissolved therein which normally tends to deposit in the cylinders of the motor and containing, as a gum flux, from 0.2 to 2% of a normally liquid methyl naphthalene hydrocarbon having a boiling point above 450° F.

11. A motor fuel comprising gasoline containing a non-volatile gum dissolved therein which normally tends to deposit in the cylinders of the motor and containing, as a gum flux, from 0.2 to 2% of a normally ethyl naphthalene hydrocarbon having a boiling point above 450° F.

12. A motor fuel comprising gasoline containing a non-volatile gum dissolved therein which normally tends to deposit in the cylinders of the motor and containing, as a gum flux, from 0.2 to 2% of a normally liquid alkylated naphthalene hydrocarbon wherein the alkyl group contains from three to four carbon atoms, said alkylated hydrocarbons having a boiling point above 450° F.

VANDERVEER VOORHEES.
JESSE RUSSELL WILSON.

CERTIFICATE OF CORRECTION.

Patent No. 2,080,681.  May 18, 1937.

JESSE RUSSELL WILSON, ET AL.

It is hereby certified that error appears in the printed specification of the above numbered patent requiring correction as follows: Page 2, second column, line 33, claim 11, after the word "normally" insert liquid; and that the said Letters Patent should be read with this correction therein that the same may conform to the record of the case in the Patent Office.

Signed and sealed this 20th day of July, A. D. 1937.

(Seal)

Henry Van Arsdale
Acting Commissioner of Patents.

CERTIFICATE OF CORRECTION.

Patent No. 2,080,681.                                                           May 18, 1937

JESSE RUSSELL WILSON, ET AL.

It is hereby certified that error appears in the printed specification of the above numbered patent requiring correction as follows: Page 2, second column, line 33, claim 11, after the word "normally" insert liquid; and that the said Letters Patent should be read with this correction ther that the same may conform to the record of the case in the Patent Office.

Signed and sealed this 20th day of July, A. D. 1937.

(Seal)                                                     Henry Van Arsdale
                                                          Acting Commissioner of Patents.

DISCLAIMER 2,080,681.—*Jesse Russell Wilson*, Chicago, Ill., and *Vanderveer Voorhees*, Hammond, Ind. MOTOR FUEL. Patent dated May 18, 1937. Disclaimer filed December 13, 1940, by the assignee, *Standard Oil Company (Indiana)*.
  Hereby enters this disclaimer to claims 6, 9, 10, and 11 in said specification.
  [*Official Gazette January 21, 1941.*]